United States Patent
Campbell

(10) Patent No.: US 8,469,151 B1
(45) Date of Patent: Jun. 25, 2013

(54) BYPASS APPARATUS FOR AUTOMATIC TRANSMISSION FLUID COOLER AND METHOD OF USE

(75) Inventor: MacKenzie Campbell, Baltimore, VT (US)

(73) Assignee: Sonnax Industries, Inc., Bellows Falls, VT (US)

( * ) Notice: Subject to any disclaimer, the term of this patent is extended or adjusted under 35 U.S.C. 154(b) by 1028 days.

(21) Appl. No.: 12/008,610

(22) Filed: Jan. 11, 2008

Related U.S. Application Data

(60) Provisional application No. 60/880,226, filed on Jan. 12, 2007.

(51) Int. Cl.
*F01M 5/00* (2006.01)
*F01P 11/08* (2006.01)

(52) U.S. Cl.
USPC ........................................................ 184/104.1

(58) Field of Classification Search
USPC ............... 184/6.12, 6.22, 104.1, 104.2, 104.3
See application file for complete search history.

(56) References Cited

U.S. PATENT DOCUMENTS

| | | | | |
|---|---|---|---|---|
| 4,848,453 A | * | 7/1989 | Evans | 165/44 |
| 5,165,468 A | * | 11/1992 | Tajima et al. | 165/47 |
| 5,992,515 A | * | 11/1999 | Spiegel | 165/283 |
| 6,012,550 A | * | 1/2000 | Lee | 184/6.22 |
| 6,830,527 B2 | * | 12/2004 | Wakayama | 475/161 |
| 7,665,513 B2 | * | 2/2010 | Sasaki | 165/298 |

OTHER PUBLICATIONS

Advertisement including photograph depicting VW Cooler Kit ( Part #FKVW) and a parts list, entitled, August Specials 2005, including New Products listing (FKVW) published in Aug. 2005 by Matech BTA Inc. 1570 Saint-Charles Blvd., Saint-Charles-De-Drummond, Quebec J2C 4Z5, Canada (2 pgs. not numbered).

* cited by examiner

*Primary Examiner* — William E Dondero
*Assistant Examiner* — Robert T Reese
(74) *Attorney, Agent, or Firm* — Downs Rachlin Martin PLLC

(57) ABSTRACT

An aftermarket ATF cooler bypass apparatus for replacement of an original equipment ATF cooler for VW/AUDI and other similar vehicles. The present cooler bypass apparatus is provided in a service kit comprising a pair of cylindrical ATF chambers, which are mounted on the transmission case in fluid communication with integrated hydraulic pressure and return circuits. The present ATF chambers are provided with hose fittings for attachment of hydraulic lines that deliver ATF to an aftermarket cooler, which is remotely mounted on the vehicle at a suitable location. Conventional hose clamps and a hose coupling are provided in the present kit to interconnect the engine coolant hoses, which are disconnected from the original equipment cooler in a method of the present invention. The present kit also includes new O-ring seals for installation on the original equipment cooler retaining bolts to ensure the hydraulic integrity of the present ATF cooler bypass apparatus.

14 Claims, 7 Drawing Sheets

BYPASS APPARATUS FOR AUTOMATIC TRANSMISSION FLUID COOLER AND METHOD OF USE

CROSS-REFERENCE TO RELATED APPLICATION

This application claims the benefit under 35 U.S.C. §119 (e) of U.S. Provisional Patent Application No. 60/880,226 filed Jan. 12, 2007, entitled Bypass Apparatus for Automatic Transmission Fluid Cooler and Method of Use.

BACKGROUND OF INVENTION

The present invention relates to automatic transmission systems for land vehicles and, more particularly, to a bypass apparatus for an automatic transmission fluid (hereinafter "ATF") cooler to facilitate the installation of an aftermarket ATF cooler in replacement of the original equipment ATF cooler.

Numerous VOLKSWAGEN/AUDI (hereinafter "VW/AUDI") vehicles dating from the 1989 model year are equipped with an oil-to-water type ATF cooler 100 (see FIG. 1) to maintain ATF within a recommended temperature range during operation. For purposes of this application, the term "oil-to-water" ATF cooler refers to the cooling method employed within the cooler 100. That is, ATF flows continuously through a specially designed radiator 115 disposed within an integral water jacket 105 containing engine coolant to affect heat transfer and ATF cooling. The water jacket 105 is designed to surround the ATF radiator 115 so that ATF flows in close proximity to the engine coolant. In this manner heat is transferred from the ATF radiator 115 to the water jacket 105 and is carried away by the engine coolant to maintain the ATF within the recommended temperature range during vehicle operation.

A common service problem in the VW/AUDI vehicles occurs when particulate debris carried in the ATF accumulates within the multiple flow paths in the radiator 115. Such particulate accumulation eventually blocks flow through the ATF radiator 115 and, accordingly, its cooling function is impaired resulting in overheating. In addition, due to the internal construction of the radiator 115, flushing of ATF from the hydraulic system at normal service intervals is ineffective in clearing such radiator blockage. Further, the ATF cooler 100 may develop internal leaks, which allow engine coolant to mix with the ATF causing corrosion within the hydraulic system.

Thus, replacement of this expensive ATF cooler component in the VW/AUDI vehicles is required at regular service intervals to restore the ATF to the recommended temperature range during operation.

A prior art apparatus for this application is available and its discussion follows. A so-called VW Cooler Kit, has been marketed by a Canadian company, Matech BTA Inc., 1570 Saint-Charles Blvd., Saint-Charles-De-Drummond, Quebec J2C 4Z5, Canada since June, 2005. However, the present invention provides new and useful improvements to this prior art apparatus. More particularly, the prior art VW Cooler Kit as disclosed in the attached Information Disclosure Statement (PTO-A820) lacks structural elements and other features of the present invention, namely, the cylindrical ATF chambers 15, 16 (see FIG. 2) which are configured to receive the original equipment cooler retaining bolts 106, 108 in sealing engagement. The present ATF chambers 15, 16 are rotatable 360° about each cooler retaining bolt 106, 108 respectively in order to position hose fittings or so-called hose barbs 30 at a desired orientation in functional alignment with hydraulic lines 130, 135 during installation of the aftermarket cooler 125 (see FIG. 7). In contrast to the prior art apparatus, the hose barbs 30 of the present invention are disposed in perpendicular relation to the ATF chambers 15, 16 to prevent crimping of the hydraulic lines 130, 135 which results in reduced ATF flow to the cooler 125 as described hereinafter in further detail.

Thus, the present apparatus and method of use has been developed to overcome the shortcomings of the prior art.

SUMMARY OF THE INVENTION

Accordingly, the present invention is an ATF cooler bypass apparatus that permits the installation of a less expensive, aftermarket ATF cooler at a suitable remote location on the vehicle in replacement of the original equipment manufacture (hereinafter "OEM") ATF cooler for VW/AUDI vehicles and other similar vehicles. The present cooler bypass apparatus is provided in a service kit comprised of a pair of cylindrical ATF chambers, which are mounted on the OEM transmission case in fluid communication with the original hydraulic pressure and return circuits in replacement of the OEM cooler. The present ATF chambers are provided with barbed hose fittings for attachment of hydraulic lines thereon, which deliver ATF to an aftermarket ATF cooler remotely mounted on the VW/AUDI vehicles at a suitable location. Standard hose clamps and a barbed hose coupling are also included in the present service kit to interconnect the OEM engine coolant hoses, which are disconnected from the OEM cooler and joined together to provide the return flow of engine coolant.

In a method of the present invention, the OEM cooler retaining bolts, which include an integral fluid gallery, are reused to secure the present ATF chambers to the transmission case. The present kit also includes new O-ring seals for installation on the OEM cooler retaining bolts to ensure the hydraulic integrity of the present cooler bypass apparatus.

There has thus been outlined, rather broadly, the important features of the invention in order that the detailed description thereof that follows may be better understood, and in order that the present contribution to the art may be better appreciated. There are additional features of the invention that will be described hereinafter and which will form the subject matter of the claims appended hereto.

Those skilled in the art will appreciate that the conception upon which this disclosure is based may readily be utilized as a basis for the designing of other structures, methods, and systems for carrying out the purposes of the present invention. It is important, therefore, that the claims be regarded as including such equivalent constructions insofar as they do not depart from the spirit and scope of the present invention.

Other features and technical advantages of the present invention will become apparent from a study of the following description and the accompanying drawings.

BRIEF DESCRIPTION OF THE DRAWINGS

The novel features of the present invention are set forth in the appended claims. The invention itself, however, as well as other features and advantages thereof will be best understood by reference to the following detailed description of an illustrative embodiment when read in conjunction with the accompanying figures, wherein:

DETAILED DESCRIPTION OF THE PREFERRED EMBODIMENTS

Figure 1:
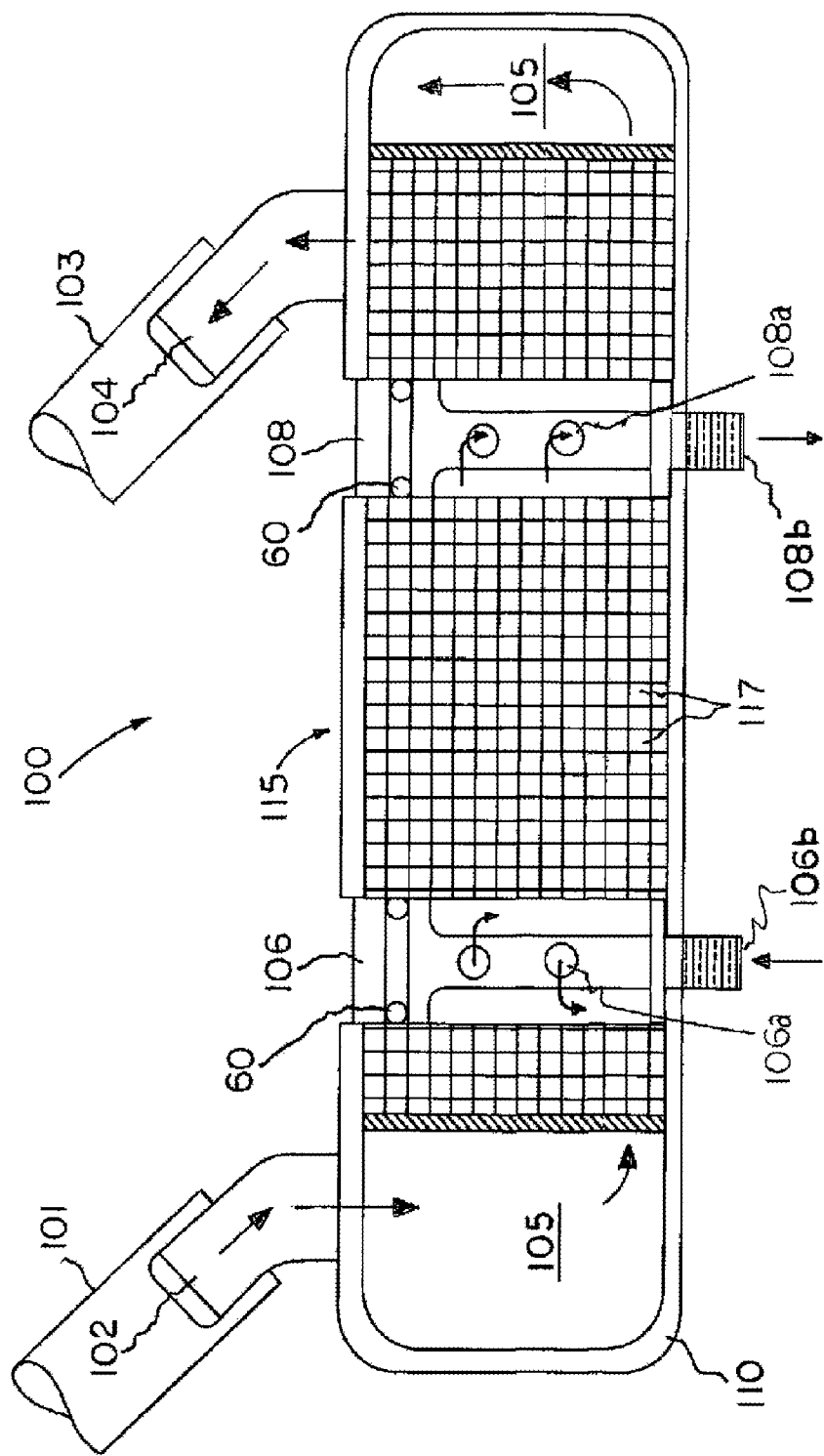
FIG. 1 is a longitudinal cross-section of an original equipment ATF cooler for the VW/AUDI vehicles and is labeled Prior Art.

With further reference to the drawings there is shown therein an original equipment ATF cooler of the so-called oil-to-water type that is typically utilized in the VW/AUDI vehicles, indicated generally at 100 and illustrated in FIG. 1. In the VW/AUDI vehicles engine coolant is delivered to the ATF cooler 100 from the vehicle's water pump (not shown) via cooler inlet 102 by a water hose 101 and circulates (as shown by directional arrows) through water jacket 105, which is integrally formed within the cooler housing 110. Coolant returns to the water pump via outlet 104 carried by a water hose 103.

Simultaneously, ATF circulating within the hydraulic system of the VW/AUDI vehicles flows from a fluid pressure circuit in the transmission case 50 via bore 106b within cooler retaining bolt 106 into the ATF radiator 115 as shown in FIG. 1. ATF flows out through ports 106a formed in retaining bolt 106 (as shown by directional arrows) and into multiple internal flow passages 117 formed in radiator 115. ATF circulates through the radiator 115 and flows back into retaining bolt 108 via intake ports 108a (as shown by directional arrows) and passes via bore 108b to a return circuit in the transmission case 50 and eventually to the ATF sump to be taken up by the hydraulic pump (not shown). Using this process ATF is cooled by engine coolant, which continuously circulates in the surrounding water jacket 105 during operation.

However, particulate debris carried in the ATF eventually accumulates within the flow passages 117 in the radiator 115. Such particulate accumulation blocks ATF flow through the radiator 115 and, accordingly, its cooling function is impaired resulting in overheating. In addition, due to the internal construction of the radiator 115, flushing of ATF from the hydraulic system at normal service intervals is ineffective in clearing such radiator blockage. Further, the ATF cooler 100 may develop internal leaks, which allow engine coolant to mix with ATF causing contamination within the hydraulic system.

Thus, replacement of this expensive ATF cooler 100 utilized in the VW/AUDI vehicles is required at regular service intervals to restore the ATF to the recommended temperature range during operation. Thus, the present invention has been developed to resolve this problem and will now be described.

Figure 2:
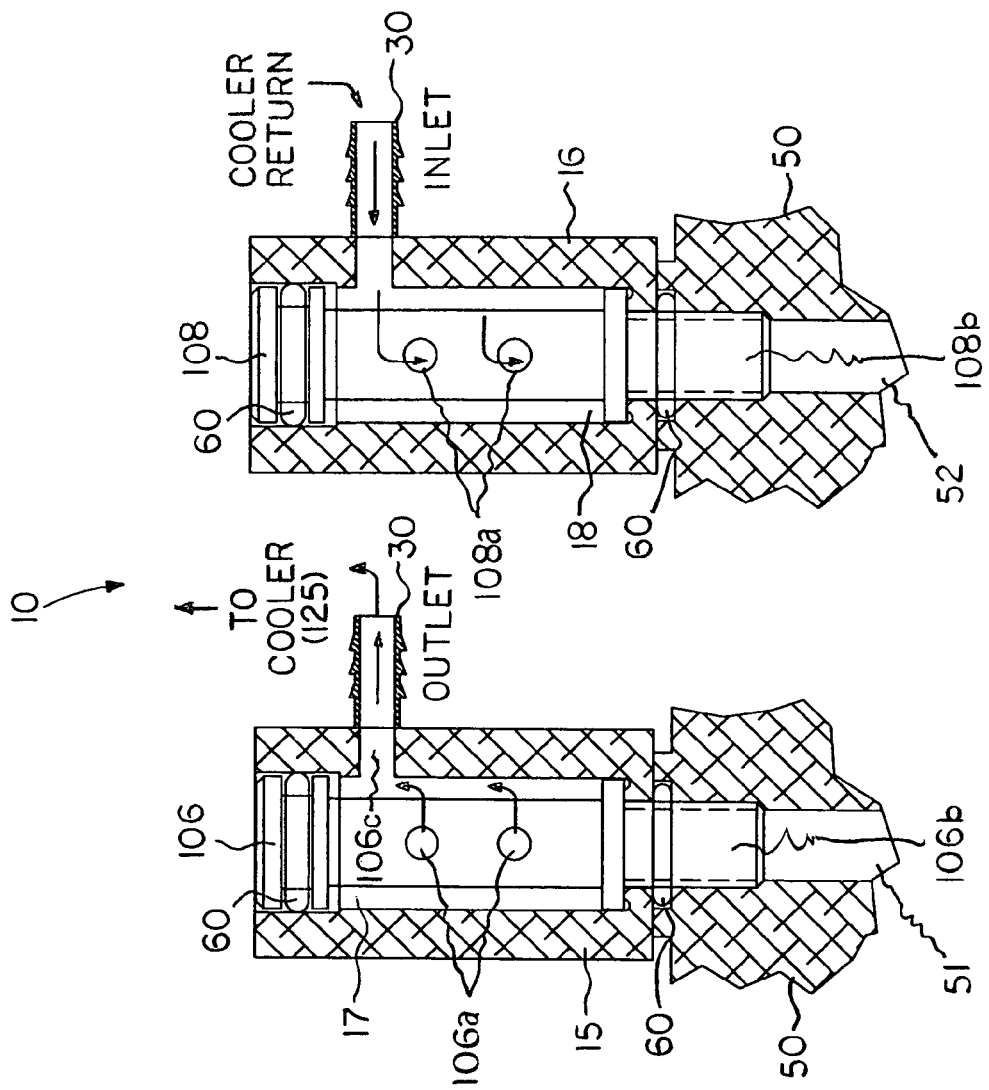
FIG. 2 is a longitudinal cross-section of the ATF cooler bypass apparatus of the present invention shown installed on the transmission case.

Referring to FIG. 2 there is shown therein an ATF cooler bypass apparatus in accordance with the present invention, indicated generally at 10. The present cooler bypass apparatus 10 includes a pair of cylindrical ATF chambers 15, 16, which are mounted on the vehicle's transmission case 50 in replacement of the OEM cooler 100. In one embodiment ATF chambers 15, 16 are fabricated from anodized aluminum or other material suitable for this application.

Figure 3:
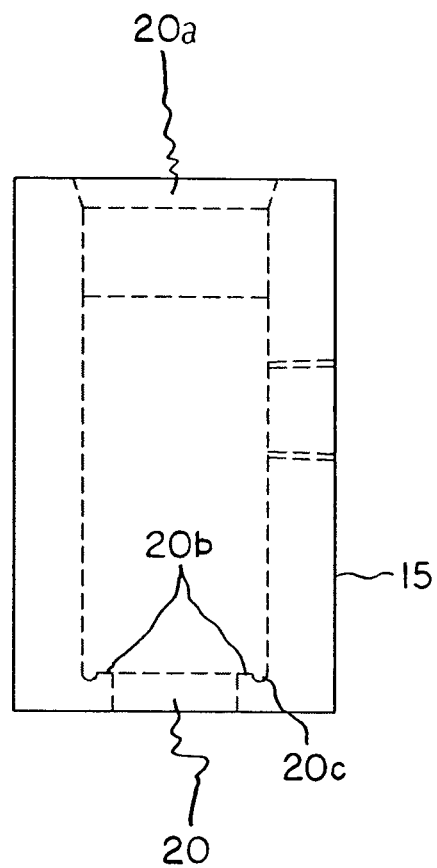
FIG. 3 is an elevation view of a single ATF chamber of the present invention.
Figure 4:
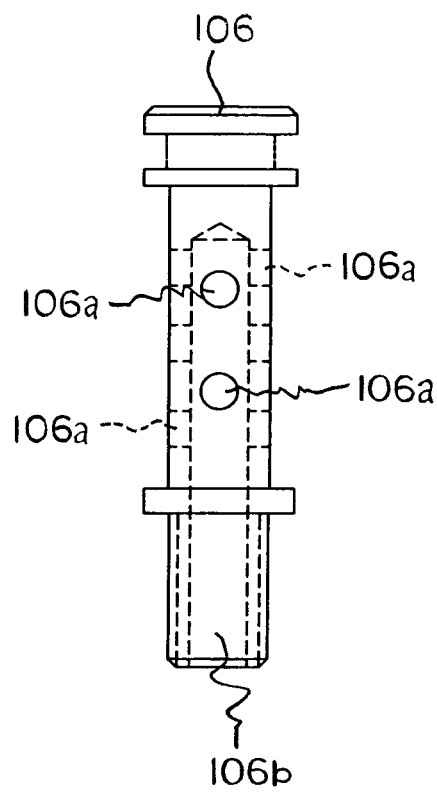
FIG. 4 is an elevation view of a single OEM cooler retaining bolt.

As more clearly shown in FIG. 3, ATF chambers 15, 16 include an internal bore 20 extending the entire length thereof. Bore 20 communicates with a coaxial counterbore 20a formed in each chamber 15, 16, which is delineated by internal shoulder 20b having an undercut relief groove 20c as shown. Critical to the present invention each bore 20 is dimensioned to receive the OEM retaining bolts 106, 108 (FIG. 4) in mating engagement when O-rings 60 are installed thereon forming sealed ATF reservoirs 17, 18 within chambers 15, 16 respectively as shown in FIG. 2. Advantageously, chambers 15, 16 are rotatable 360° about each retaining bolt 106, 108 respectively in order to position hose barbs 30 in functional alignment with ATF lines 130, 135 during installation of cooler 125 as described hereinafter in further detail (see FIG. 7).

Figure 5:
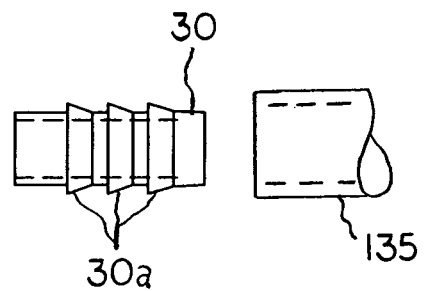
FIG. 5 is a an elevation view of a single-ended hose fitting for installation within an ATF chamber of the present invention.

Retaining bolts 106, 108 each include an integral ATF gallery including axial bores 106b, 108b each having a plurality of radially disposed ports 106a, 108a respectively formed in fluid communication therewith. When installed as shown in FIG. 2, ATF flows into bore 106b from a pressure circuit 51 formed in the transmission case 50 and is initially delivered to ATF chamber 15 via ports 106a (as shown by directional arrows). ATF exits chamber 15 from a threaded outlet hole 106c wherein a single-ended hose fitting or so-called hose barb 30 having a matching thread is installed. As shown more clearly in FIG. 5 hose barb 30 is provided with a plurality of frustoconical projections or ridges 30a to engage the inner surface of a mating hydraulic line 135 (FIG. 7), which delivers ATF to cooler 125 in operation.

An air-cooled ATF cooler 125 of the type sold under the tradename, TRU-COOL, is commercially available in the transmission aftermarket from Makco Distributing, Inc., Rowlett, Tex. 75088 and is suitable for this application. Since such aftermarket ATF coolers are well known to those skilled in the art, further detailed discussion of the same is not deemed necessary.

Figure 6:
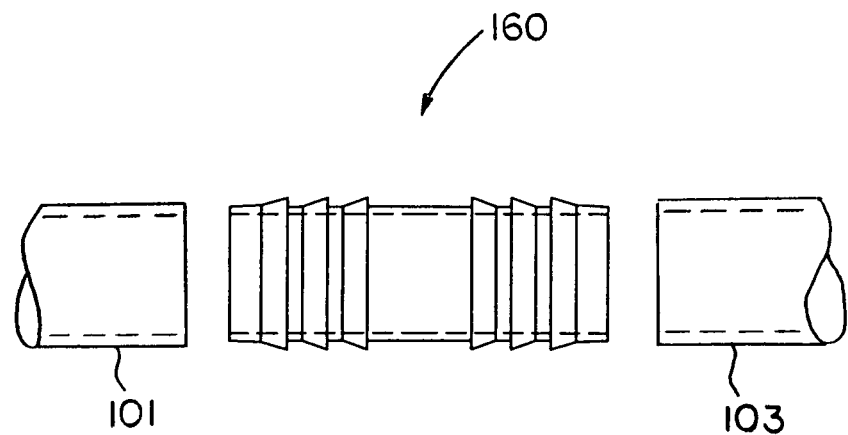
FIG. 6 is an elevation view of a barbed hose coupling of the present invention.
Figure 8:
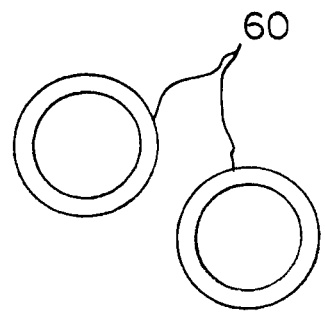
FIG. 8 is a plan view of the O-ring seals of the present invention.

A barbed hose union or coupling, indicated generally at 160, and shown in FIG. 6 is also provided in the present kit to interconnect the OEM water lines 101, 103 after removal of the OEM cooler 100 (FIG. 1) to provide for the return flow of engine coolant to the water pump. The present kit includes new O-ring seals 60 for installation on the OEM cooler retaining bolts 106, 108 as shown in FIG. 8 to ensure the hydraulic integrity of the present bypass apparatus 10. In addition, the present kit also includes a pair of hose clamps, indicated generally at 175 and illustrated in FIG. 9, to secure the water hoses 101, 103 in position on hose coupling 160 (FIG. 6).

Figure 9:
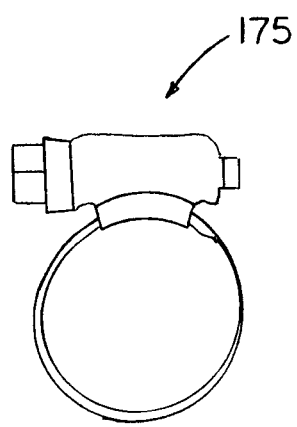
FIG. 9 is a side elevation view of a hose clamp of the present invention.

In a method of the present invention water hoses 101, 103 are initially removed from inlet 102 and outlet 104 (FIG. 1) respectively and connected by hose coupling 160 (FIG. 6) with hose clamps 175 of a type shown in FIG. 9 to provide for the circulation of engine coolant back to the vehicle's engine. Next, the OEM cooler retaining bolts 106, 108 are disengaged from the transmission case 50 and withdrawn from the OEM cooler 100 and retained for reuse. Thereafter, the OEM cooler 100 is removed from the transmission case 50 and discarded.

Next, ATF chambers 15, 16 with hose barbs 30 installed therein are attached to transmission case 50 as shown in FIG. 2 in replacement of the OEM cooler 100. OEM retaining bolts 106, 108 with new O-ring seals 60 in position (FIG. 2) are utilized to secure fluid chambers 15, 16 in position. Prior to a final tightening of retaining bolts 106, 108, fluid chambers 15, 16 are rotated in place about retaining bolts 106, 108 to a predetermined radial position to align hose barbs 30 with hydraulic lines 130, 135 (FIG. 7) for convenient attachment thereof. Advantageously, hose barbs 30 are disposed in perpendicular relation to fluid chambers 15, 16 to prevent crimping of hydraulic lines 130, 135 during installation which can result in reduced ATF flow to the cooler 125.

Figure 7:
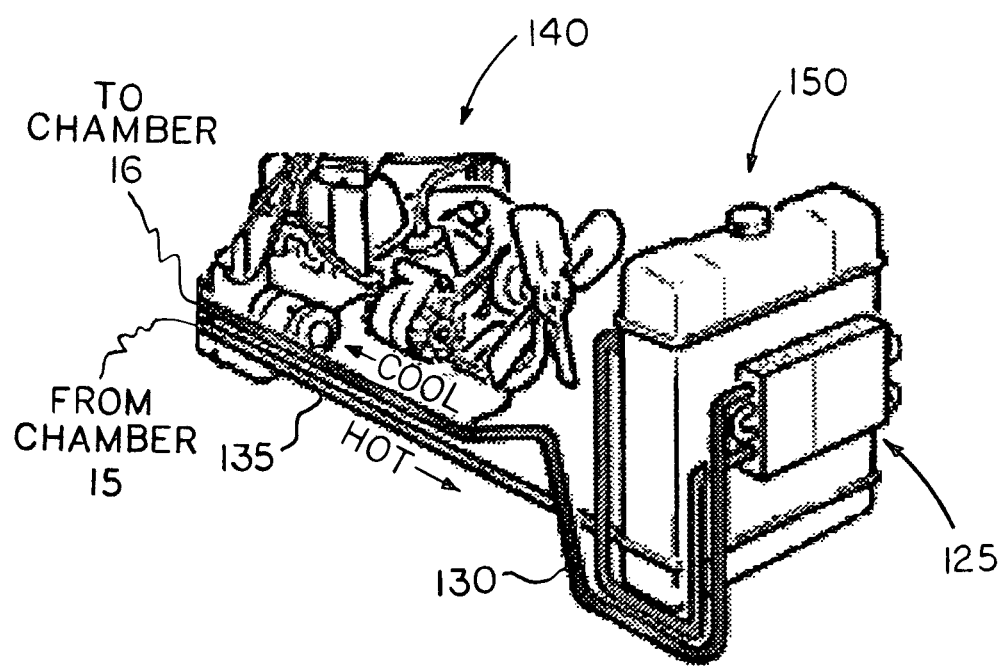
FIG. 7 is a perspective view of a vehicle engine and radiator illustrating an aftermarket ATF cooler installed thereon.

Next, the aftermarket cooler 125 is installed at a position in front of the radiator 150 of the vehicle shown in FIG. 7. Hydraulic lines 135 (HOT) and 130 (COOL) provided with the cooler 125 are attached to ATF chambers 15, 16 respectively to complete the cooler bypass installation.

Although not specifically illustrated in the drawings, it should be understood that additional equipment and structural components will be provided as necessary and that all of the components described above are arranged and supported in an appropriate fashion to form a complete and operative ATF Cooler Bypass Apparatus and Method of Use incorporating features of the present invention.

Moreover, although illustrative embodiments of the invention have been described, a latitude of modification, change, and substitution is intended in the foregoing disclosure, and in certain instances some features of the invention will be employed without a corresponding use of other features. Accordingly, it is appropriate that the appended claims be construed broadly and in a manner consistent with the scope of invention.

Having described preferred embodiments of our invention, what we desire to secure by U.S. Letters Patent is:

1. A transmission fluid cooler bypass apparatus for use in combination with an transmission fluid cooler for a land vehicle in replacement of an original equipment oil-to-water type transmission fluid cooler having water inlet and water outlet hoses connected thereto for circulating engine coolant therethrough, said original equipment oil-to-water type transmission cooler in fluid communication with integrated fluid circuits within a transmission case of said land vehicle by a pair of original equipment cooler retaining bolts, wherein each of said original equipment cooler retaining bolts include an internal fluid gallery formed therein, said transmission fluid cooler bypass apparatus comprising:
    a pair of fluid chambers rotatably mounted between a transmission fluid cooler and the transmission case, said pair of fluid chambers providing a portion of a transmission fluid pathway from the transmission case to the transmission fluid cooler, and wherein said pair of fluid chambers are configured to receive the original equipment cooler retaining bolts therein in sealing engagement for rotatably mounting said pair of fluid chambers to the transmission case; said fluid chambers are rotatable about said retaining bolts with respect to the transmission case, and
    a pair of hose fittings coupled to and in fluid communication with a corresponding respective one of said pair of fluid chambers, wherein one of said pair of hose fittings is a transmission fluid outlet, designed and configured to facilitate the transfer of transmission fluid from one of said pair of fluid chambers to the transmission fluid cooler, and wherein another one of said pair of hose fittings is a transmission fluid inlet, designed and configured to facilitate the transfer of transmission fluid from the transmission fluid cooler to another of said pair of fluid chambers.

2. The transmission fluid cooler bypass apparatus of claim 1, wherein:
    said pair of fluid chambers each include an internal bore with a first end and a second end defining a fluid reservoir through which the original equipment cooler retaining bolts are installed;
    a first seal is disposed around each said retaining bolt at the first end to seal between the fluid chamber and the transmission case; and
    a second seal is disposed around each said retaining bolt at the second end to seal between the fluid chamber and the retaining bolt.

3. The transmission fluid cooler bypass apparatus of claim 1, wherein said hose fittings are disposed in perpendicular relation to said fluid chambers to prevent crimping of transmission fluid lines attached thereto when said transmission fluid lines are attached in fluid communication with a transmission fluid cooler.

4. A method of bypassing an original equipment oil-to-water type transmission fluid cooler in a land vehicle, said original equipment oil-to-water type transmission cooler being installed in fluid communication with fluid circuits integrally formed in a transmission case of said vehicle, said original equipment oil-to-water type transmission cooler including water inlet and water outlet hoses attached thereto for circulating engine coolant therein, said original equipment oil-to-water type transmission cooler being attached to said transmission case by a pair of original equipment cooler retaining bolts each having a plurality of original equipment a-ring seals installed thereon, wherein said original equipment cooler retaining bolts each include an integral fluid gallery formed therein, said method comprising the steps of:
    mounting a pair of transmission fluid chambers in place of said original equipment oil-to-water type transmission cooler, the pair of transmission fluid chambers each having a single fluid port extending through a sidewall for the attachment of one of a pair of a hose fittings, wherein
        each of said pair of fluid chambers is rotatably positioned on one retaining bolt with each fluid chamber being rotatable around said retaining bolt with respect to the transmission case during said mounting,
        each said retaining bolt provides a fluid path between the transmission and its respective fluid chamber,
        one of the pair of hose fittings is a transmission fluid outlet, for facilitating the transfer of a transmission fluid from one of the pair of transmission fluid chambers to a transmission fluid cooler, and
        another of the pair of hose fittings is a transmission fluid inlet, for facilitating the transfer of a transmission fluid from the transmission fluid cooler to another of said pair of transmission fluid chambers;
    mounting the transmission cooler to the vehicle; and
    coupling the transmission cooler to the pair of hose fittings to provide for circulation of transmission fluid from said transmission case to the transmission fluid cooler through the pair of transmission fluid chambers, the transmission fluid inlet, and the transmission fluid outlet.

5. The method of claim 4, wherein the step of mounting comprises:
    reusing said original equipment cooler retaining bolts to attach said fluid chambers to the transmission case;
    rerouting said engine coolant to an engine of said vehicle through said water inlet and said water outlet hoses; and
    connecting transmission fluid lines from said transmission fluid chambers to said transmission cooler for circulating transmission fluid thereto during operation.

6. The method of claim 5, wherein the step of reusing comprises:
    removing said original equipment O-ring seals from said cooler retaining bolts;
    installing O-ring seals on said cooler retaining bolts;

inserting said cooler retaining bolts into said fluid chambers in sealing engagement therewith;
rotating said fluid chambers relative to said transmission fluid lines connected to said transmission cooler; and
advancing said cooler retaining bolts in threaded engagement with said transmission case to retain said fluid chambers thereon.

7. The method of claim 5, wherein the step of rerouting comprises:
disconnecting said water inlet and water outlet hoses from said original equipment oil-to-water type transmission cooler; and
interconnecting said water inlet hose and said water outlet hose in fluid communication to deliver a return flow of engine coolant to an engine of said vehicle.

8. The method of claim 7, wherein the step of interconnecting comprises installing a hose coupling.

9. The method of claim 4, further comprising rotating said fluid chambers about said cooler retaining bolts to position the fluid ports for attachment of the hose fittings.

10. A transmission fluid cooler bypass kit for use in combination with a transmission fluid cooler for a land vehicle in replacement of an original equipment oil-to-water type transmission fluid cooler, said original equipment oil-to-water type transmission cooler in fluid communication with fluid circuits within a transmission case of said land vehicle by a pair of original equipment cooler retaining bolts, wherein each of said original equipment cooler retaining bolts include an internal fluid gallery formed therein, said transmission fluid cooler bypass kit comprising:
a pair of fluid chambers configured and dimensioned to receive said original equipment cooler retaining bolts therein for rotation with respect to the transmission case during mounting thereto, wherein
said pair of fluid chambers each comprise
a chamber member with first end and second ends, the first end configured and dimensioned to sealingly engage the transmission case, and the second end configured and dimensioned to rotatably and sealingly engage the retaining bolt,
a central, internal bore extending through said chamber member for receiving said retaining bolt and providing a fluid path,
a transverse opening through said chamber member disposed between the first and second ends communicating with said internal bore, and
a hose connection cooperating with said opening, and
each of said pair of chambers is rotatable about each retaining bolt respectively in order to position said hose connection in functional alignment with transmission fluid lines during installation of a transmission cooler;
a plurality of seals for installation on the original equipment cooler retaining bolts; and
a plurality of hoses and hose fittings configured to connect said hose barbs to a transmission oil cooler disposed remotely from said chambers.

11. The transmission fluid cooler bypass kit of claim 10, wherein said pair of fluid chambers each include an internal bore defining a fluid reservoir wherein the original equipment cooler retaining bolts are installed.

12. The transmission fluid cooler bypass kit of claim 10, wherein said fluid chambers are rotatable about the retaining bolts and said hose fittings are sized and configured so as to prevent crimping of transmission fluid lines attached thereto when said transmissions lines are attached in fluid communication with said transmission fluid cooler.

13. The transmission fluid cooler bypass kit of claim 10, wherein said plurality of hoses and hose fittings comprises:
a pair of hose fittings sized and configured to mount to said hose connections on the fluid chambers, wherein one of the pair of hose fittings provides a transmission fluid outlet for facilitating the transfer of a transmission fluid from one of said pair of fluid chambers to a transmission fluid cooler, and another of the pair of hose fittings provides a transmission fluid inlet for facilitating the transfer of a transmission fluid from the transmission fluid cooler to said other of said pair of fluid chambers;
at least one hose coupling for interconnection of transmission cooler water inlet and water outlet hoses to return engine coolant to an engine of said vehicle; and
a plurality of hose clamps for attachment of water inlet and said water outlet hoses to said hose coupling.

14. The transmission fluid cooler bypass kit of claim 10, wherein each of said pair of fluid chambers is rotatable through 360° about each retaining bolt, respectively.

* * * * *